No. 655,569. W. M. MUSGRAVE. Patented Aug. 7, 1900.
VALVE GEAR.
(Application filed Oct. 9, 1899.)
(No Model.) 3 Sheets—Sheet 1.
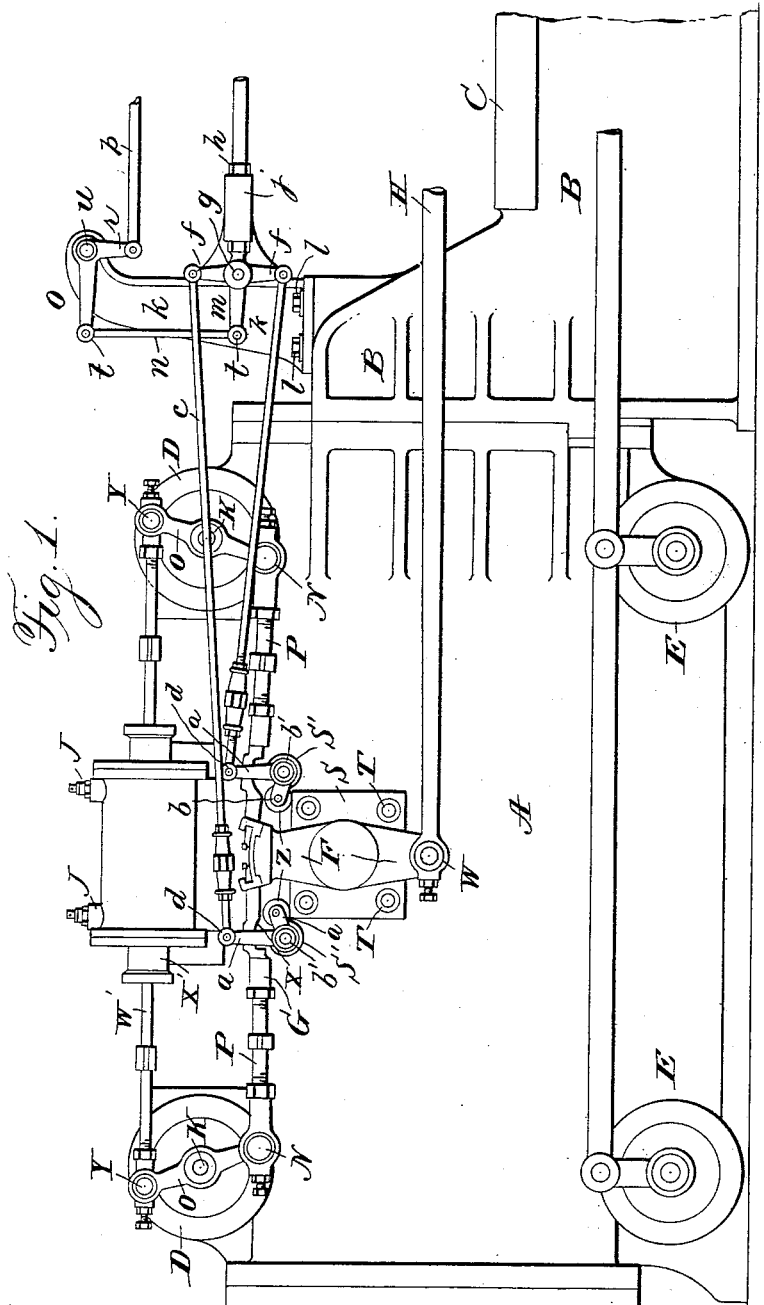
Witnesses:
Jas E Hutchinson
Inventor
Walter Martin Musgrave,
By James L. Norris
Attorney

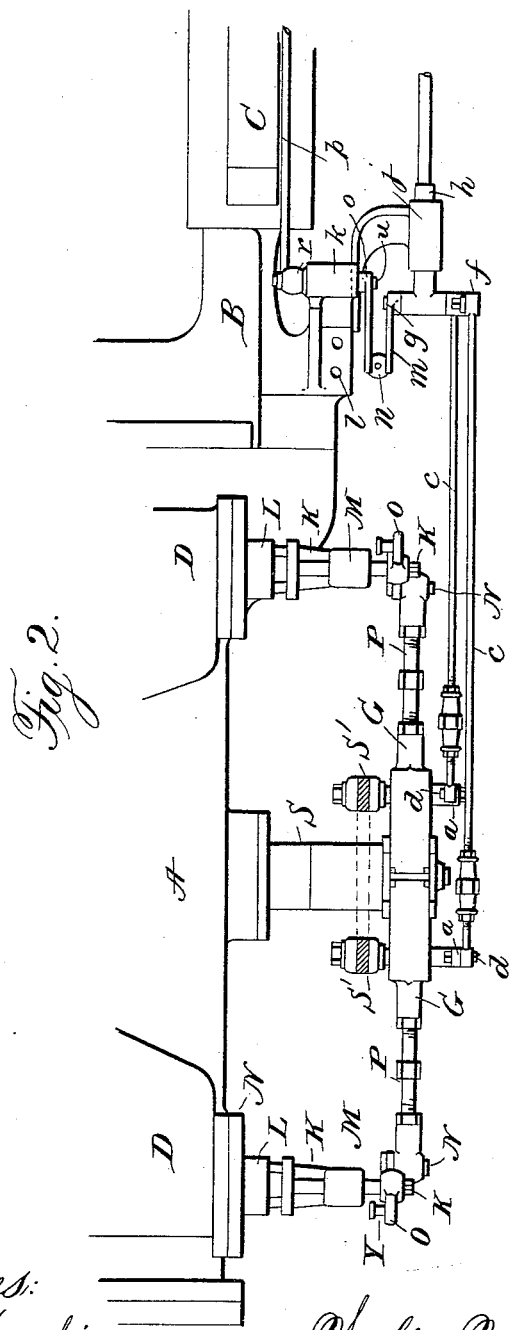

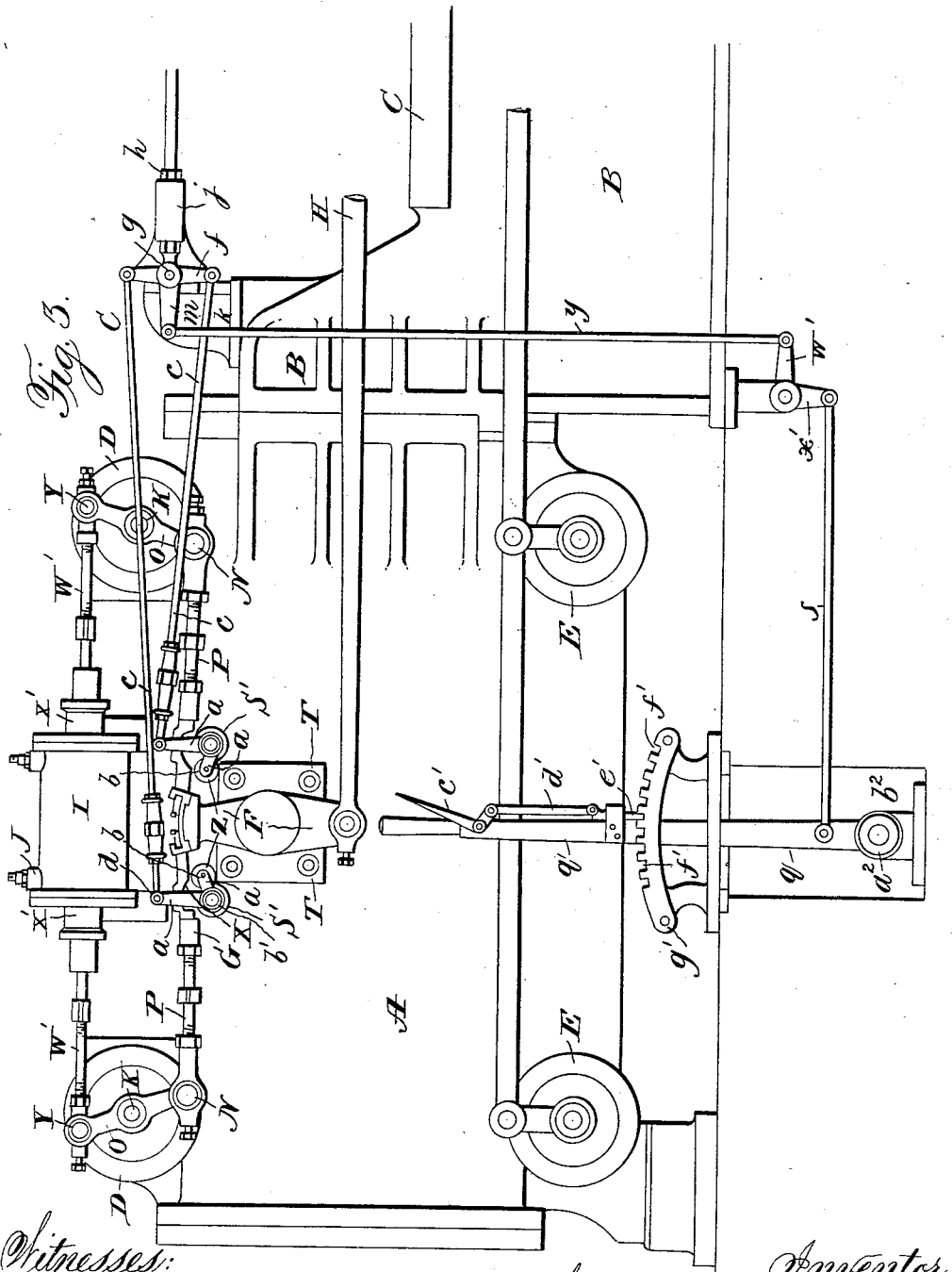

UNITED STATES PATENT OFFICE.

WALTER MARTIN MUSGRAVE, OF BOLTON, ENGLAND.

VALVE-GEAR.

SPECIFICATION forming part of Letters Patent No. 655,569, dated August 7, 1900.

Application filed October 9, 1899. Serial No. 733,084. (No model.)

*To all whom it may concern:*

Be it known that I, WALTER MARTIN MUSGRAVE, of the firm of John Musgrave & Sons, Limited, Bolton, in the county of Lancaster, England, have invented certain new and useful Improvements in or Relating to Valve-Gear for Corliss and other Motive-Power Engines and in Apparatus Therefor, of which the following is a specification.

This invention refers to improvements in or relating to valve-gear for "Corliss" and other motive-power engines and in apparatus therefor; and it consists in means for allowing of the same being actuated with full or open steam-ports, say, from nothing to seven-eighths of the stroke of the engine by the controlling action of the governor, between which points of the stroke of the engine the "cut-off" may be effected. This I carry into effect by mounting on the Corliss-valve spindles levers to which are provided adjustable rods, to the other ends of which are attached tripping rods or bars or their equivalents, extending to the rocking lever, suitably mounted on the side of the cylinder or otherwise, the said rocking lever being operated by an eccentric and rod from the crank-shaft of the engine or other convenient part from which a reciprocating motion may be obtained. The adjustable tripping bars or rods or their equivalents are provided with specially-formed surfaces, against which operate bowls or rollers mounted on levers pivoted to a fixing or preparation on the side of the cylinder. The last-mentioned levers are connected by adjustable or other rods to a lever or levers mounted on a shaft or center actuated by levers and rods coupled in any convenient manner to the governor. The lever or levers to which are attached the adjustable or other rods are supported on and operated by a mounted sliding rod actuated to and fro by an eccentric and rod or their equivalents from the crank-shaft or other convenient part of the engine. The usual "dash-pots" and "snift-valves" are provided to close the steam-valves immediately the tripping bars or rods or their equivalents are released from the rocking lever. The exhaust Corliss valves are operated independently by means of eccentric and rods from any convenient part of the engine.

This invention is equally applicable to what are known as "winding-engines" for collieries and like purposes and is provided with a hand arrangement for effecting the cut-off from nothing to seven-eighths of the stroke of the engine.

In the drawings, Figure 1, Sheet 1, is a longitudinal elevation of my invention for improvements in or relating to valve-gear for what are well known as "Corliss" engines; Fig. 2, a plan of Fig. 1; and Fig. 3, Sheet 2, a longitudinal elevation of my invention for improvements in or relating to Corliss valve-gear for what are well known as "winding-engines" for collieries and like purposes, wherein the cut-off is regulated by hand by means of the ordinary reversing-lever in lieu of a governor.

In all the figures the same letters are employed to indicate corresponding parts.

A is the steam-cylinder of a Corliss engine; B, foundation-plate; C, slide-bars; D, steam-valve boxes; E, exhaust-valve boxes; F, rocking lever; G, tripping rods or bars; H, eccentric-rod; I, dash-pots, and J snift-valves.

In the steam-valve boxes D are located Corliss valves mounted on the valve-spindles K, extending through the stuffing-boxes L to the outside, the outer ends of the valve-spindles K being supported in the bearings M, attached to the valve-box covers N. On the outer end of each valve-spindle K is mounted the lever O, to which is attached the adjustable rod P by means of the pin N*. To the other end of each adjustable rod P is attached the tripping rod or bar G, extending to and over the upper end of the rocking lever F, mounted on the fixing S, attached to the side of the steam-cylinder A, the fixing S being secured thereto by the bolts or set-screws T or their equivalents. The rocking lever F is operated by an eccentric and the rod H from the crank-shaft of the engine or other convenient part from which a reciprocating motion may be obtained. The end of the eccentric-rod H is attached to the rocking lever F by the pin or center W. The adjustable tripping rods or bars G or their equivalents are provided with the specially-formed surfaces X, against which operate the bowls or rollers Z, mounted on the levers *a*, pivoted by the pins or centers *b'* to the fixing or bracket S', attached to or suspended from the under side of the dash-pot I. The levers $a$ are connected by the pins or centers $d$ to the adjustable or other rods $c$, the other ends of the latter connecting with the levers $f$, mounted on the loose center $g$, attached to the sliding rod $h$, mounted in the bearing $j$ on the fixing $k$, secured to the foundation-plate B by the bolts or set-screws $l$. On the center $g$, carrying the compound levers $f$, is mounted the lever $m$, which is connected to the lever $o$ by the rod $n$ and pins $t$, the levers $o$ and $r$ being mounted on the center $u$ in the fixing $k$. The end of the lever $r$ is connected to the "governor" for regulating the speed of the engine by the rod $p$. The dash-pots I are provided internally with pistons in the usual manner, being attached to the ends of the rods W', extending through the stuffing-boxes X' to the upper ends of the levers $o$, being secured thereto by the pins or centers Y.

The operation of the mechanism described will be readily understood from the description, but may be generally stated as follows: The rocking lever F is operated by the eccentric-rod H from any suitable part of the engine which will impart a reciprocating motion. Said lever, through the medium of the lips formed on its upper end, actuates the adjustable rods G to open the valves in the boxes D to admit steam to the cylinder. The ends of the adjustable rods are raised out of or lowered into the path of said lips by coming in contact with the rollers Z, the latter being set to the proper position to be engaged by the recesses X to raise the ends of the adjustable rods and release the same by intermediate mechanism controlled by the governor. When the adjustable rods are raised out of the path of the lips of the rocking lever, the valves are closed by the action of the dash-pots I through the medium of the levers O. The different positions of the rollers Z are imposed by the variations of the governor, the rollers being moved in the arc of a circle thereby.

In adapting this invention to what are known as "winding-engines" for collieries and like purposes the apparatus for connecting the valve-gear to the governor is dispensed with and is substituted by connecting the lever $m$ to the reversing lever or handle $q$ by the rods $s$ $y$ and levers $w'$ $x'$, as shown in Fig. 3. The reversing lever or handle $q$ is mounted on the center $a^2$ in the fixing $b^2$. The reversing lever or handle $q$ is provided with the "trigger-lever" $c'$, rod $d'$, and slide $e'$, the latter being secured to the side of the lever or handle $q$ by the clip $z$. The slide $e'$ operates in conjunction with the slots $f'$ in the quadrant $g'$ to allow of the Corliss gear being set to any desired position to effect the necessary cut-off and for throwing the cut-off gear in and out of action, according to the demands required during the operations of winding up and down the "shaft" of a colliery or other similar place.

Having now particularly described and ascertained the nature of my said invention and in what manner the same is to be performed, I declare that what I claim is—

1. In a valve-gear for steam-engines provided with rotary valves, the combination with a rocking lever, of trip-rods connected to the valves and actuated by said lever, said rods being provided with recesses, of rollers movable in arcs of circles and coöperating with the recesses in the tripping-rods, and intermediate mechanism between said rollers and a governor for regulating the position of said rollers, substantially as described.

2. In valve-gear for steam-engines provided with rotary valves, the combination of trip-rods provided with recesses, and means for actuating said rods, of rollers coöperating with said trip-rods, and mechanism connected to said rollers operated by the governor to regulate the position of said rollers, substantially as described.

3. In valve-gear for engines provided with rotary valves, the combination with tripping-rods G provided with recesses X, of levers $a$, rollers Z mounted thereon, rods $c$ connected to the levers $a$, levers $f$ mounted on a center $g$ and connected to the rods $c$, a sliding rod $h$ connected to the center $g$, and mechanism operated by the governor consisting of lever $m$, rod $n$, lever $o$, $r$, and rod $p$ for moving the levers $f$ to regulate the position of the rollers Z through the medium of the levers $a$, substantially as described.

In testimony whereof I have hereunto set my hand in presence of two subscribing witnesses.

WALTER MARTIN MUSGRAVE. [L. S.]

Witnesses:
 EDMUND CHADWICK,
 JAS. STEWART BROADFOOT.